(12) United States Patent
Agapi et al.

(10) Patent No.: US 7,450,711 B2
(45) Date of Patent: Nov. 11, 2008

(54) ADJUSTING MUSIC LENGTH TO EXPECTED WAITING TIME WHILE CALLER IS ON HOLD

(75) Inventors: Ciprian Agapi, Lake Worth, FL (US); Thomas E. Creamer, Boca Raton, FL (US); James R. Lewis, Delray Beach, FL (US); Vanessa V. Michelini, Boca Raton, FL (US); Wallace J. Sadowski, Boynton Beach, FL (US); Clifford J. Strohofer, Delray Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 1072 days.

(21) Appl. No.: 10/736,420

(22) Filed: Dec. 15, 2003

(65) Prior Publication Data

US 2005/0129187 A1   Jun. 16, 2005

(51) Int. Cl.
*H04M 3/42* (2006.01)

(52) U.S. Cl. ............... 379/215.01; 379/76; 379/201.01; 379/266.01; 370/252

(58) Field of Classification Search ................ 379/76, 379/266.01, 201.01, 215.01, 214.01; 370/252
See application file for complete search history.

(56) References Cited

U.S. PATENT DOCUMENTS

| | | | |
|---|---|---|---|
| 6,400,804 | B1 | 6/2002 | Bilder |
| 6,545,589 | B1 | 4/2003 | Fuller et al. |
| 2002/0191775 | A1 | 12/2002 | Boies et al. |
| 2004/0174980 | A1* | 9/2004 | Knott et al. ............ 379/266.01 |

* cited by examiner

*Primary Examiner*—Gerald Gauthier
(74) *Attorney, Agent, or Firm*—Richard A. Tamlin, Esq.; Steven M. Greenberg, Esq.; Carey Rodriguez Greenberg & Paul LLP

(57) ABSTRACT

A method of adjusting music length to expected waiting time while a caller is on hold includes choosing one or more media selections based upon their play duration and matching the selection(s) to the expected waiting time.

10 Claims, 2 Drawing Sheets

| music1.wav | 5 minutes |
| music2.wav | 1 minute |
| music3.wav | 3 minutes |
| music4.wav | 35 minutes |
| music5.wav | 1.5 minutes |
| music6.wav | 2 minutes |

ADJUSTING MUSIC LENGTH TO EXPECTED WAITING TIME WHILE CALLER IS ON HOLD

BACKGROUND OF THE INVENTION

1. Statement of the Technical Field

The present invention relates to the field of telephony and more particularly to interactive voice response systems.

2. Description of the Related Art

Computer telephony integration (CTI), or simply "computer telephone," is the use of computers to manage telephone calls. The term is commonly used in describing the computerized services of call centers, such as those that direct a phone call to the specific extension. It is also used to describe the ability to use computers to initiate and manage phone calls.

Moving beyond simple call routing, CTI systems can include Interactive Voice Response (IVR), technology configured to accept a combination of voice telephone input and touch-tone keypad selection and to provide appropriate responses in the form of voice, fax, callback, e-mail and perhaps other media. An IVR is usually part of a larger application that includes database access. Common IVR applications include: bank and stock account balances and transfers; surveys and polls; call center forwarding; simple order entry transactions; and selective information lookup. An IVR application provides pre-recorded voice responses for appropriate situations, keypad signal logic, access to relevant data, and potentially the ability to record voice input for later handling.

In many IVR applications, a caller is required to wait in order to speak with a customer service representative or to wait for a call transfer operation. The required waiting or "on-hold" duration can range from a few seconds to many minutes. To placate, entertain, or educate the caller during the waiting period, IVR systems can be configured to offer the caller the opportunity to redirect the call, play a game, or listen to music, advertisements or informative messages. Although the concept is commendable, the execution is usually lacking and can thus further degrade the caller's experience.

For example, a caller may start a game, only to be interrupted mid-game. Thus, the system can be configured to provide two disappointing options: interrupt the game and continue with the next call option or wait until the game is completed and thereby delaying transition to the next call option. Similarly, when a caller is connected to an audio stream, the systems cut into and out of the audio stream abruptly, which can lead to an unpleasant experience. It would therefore be desirable to provide an IVR system that improves upon these shortcomings to improve a caller's experience.

SUMMARY OF THE INVENTION

The present invention addresses the deficiencies of the art in respect to IVR systems and improves a caller's experience during a hold period by choosing one or more media selections based upon their play duration and matching the selection(s) to the expected waiting time, thus providing a novel and non-obvious method, system and apparatus.

The invention also provides a computer-readable storage medium storing a computer program which when executed performs a collaborative computing method, wherein a first event is marked when a caller is placed on hold; a waiting time between the first event and a second event is queried; a database is accessed that includes a plurality of media files, wherein each media file has a play length; a playlist of at least one media file is created, wherein the runtime of the playlist is substantially equivalent to the waiting time; and the playlist is played.

Systems consistent with the present invention include a control system operative to determine when a caller has been placed on hold and to query an expected hold time; a database accessible by the control system, the database including a number of media files, wherein each media file has a play length; a playlist generated by the control system, the playlist including at least one media file, wherein the runtime of the playlist is substantially equivalent to the expected hold time; and a media player responsive to the control system for playing the playlist generated by the control system.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention provides a control application and a database of media files, wherein each media file is provided with a tag corresponding to the play or run length of the media file. The control application can select and play one or more media files, in whole or in part, in response to defined parameters.

The invention can be used as part of an Interactive Voice Response communications system. In an exemplary telephony application, callers are placed into a queue or "on-hold" upon connection and an expected waiting time is determined for the caller. The control application then selects one or more media files from the database to play or execute, wherein the media file(s) has a play or run length the same or slightly less than the expected waiting time.

If more than one media file is selected to provide a "playlist," the control application can query the system to revalidate the expected waiting time while a media selection plays and before the next one on the list starts. If the expected waiting time has changed, the control application can select a different media file that corresponds to the recalculated expected waiting time. When the system is ready to transfer or connect the call, the control application will cause play or execution of the media file to be altered, such as by fading or decreasing volume, to signal the caller that the waiting period has ended.

Although the database can include media files ranging from a few seconds to many minutes in length, should the waiting time be shorter than the shortest media file play time, the system can select any media file that is longer than the expected wait time and cause the audio to fade or decrease in volume shortly before the end of the waiting period over the course of about a half second to prevent an abrupt halt to the audio.

Figures 1, 2:
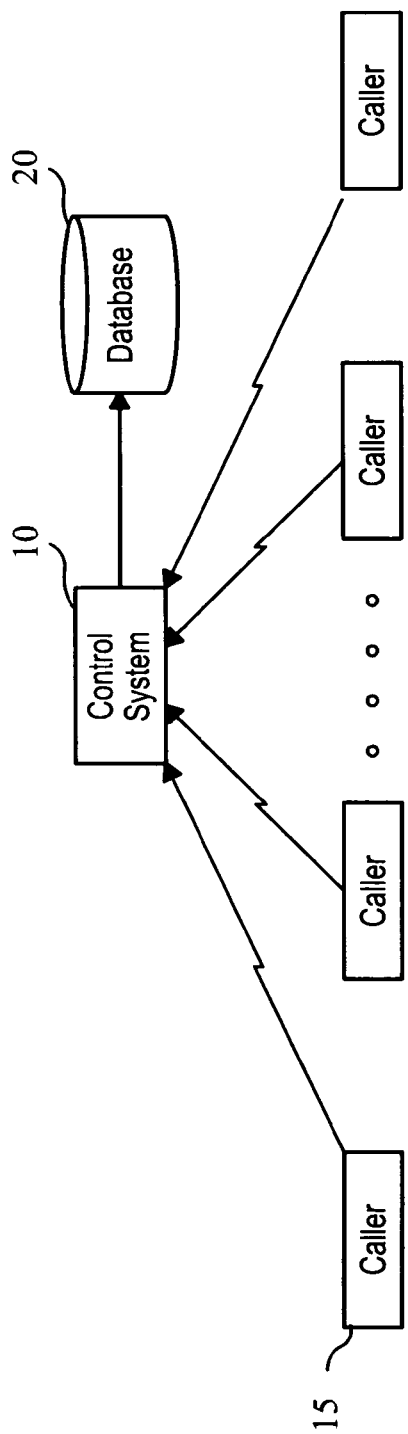
FIG. 1 illustrates a network of callers in communication with a system in accordance with the present invention.
FIG. 2 is a tabular representation of exemplary data files accessible to the communications system.

An exemplary system in accordance with the invention is illustrated in FIG. 1, wherein a control system 10 having a control application is provided for responding to external input provided by one or more callers 15 that connect with the control system over a communications network. Exemplary communications networks include wired and wireless telephone networks, as well as voice over IP and other Internet protocols. The control system 10 is in communication with a database 20 that can be integral to or remote from the control system.

The database 20 includes media files such as audio files in ".wav" or other formats, and executable files that can be played by a device or instruction set integral with or controlled by the control system 10. An exemplary set of files included in the database 20 is presented in tabular from in FIG. 2. The files are provided with identifying tags as shown in the left column and with play or run time length tags as shown in the right column. Additional tags can be provided as desired. For example, musical selections can be identified by genre (e.g., jazz, rock, classical, etc.).

In first example, an expected wait time of 3 minutes has been determined. The control application evaluates the database and creates one or more possible play options or playlists. One option is to play "music3.wav" having a 3-minute playtime as shown in FIG. 2. A second option is to play "music6.wav" (2-minute playtime) followed by "music2.wav" (1-minute playtime). The control program then selects the first or second option based upon established preferences. For example, a system operator may wish for callers to hear few or many complete selections during the hold time. If the preference is for the caller to hear the least number of selections, then the first option is selected and "music3.wav" is played to its conclusion, immediately followed by another event, such as transfer to a customer support agent.

In a second example, an expected wait time of 8 minutes has been determined and the control application selects possible play options or playlists from the database. One option is to play "music1.wav" (5-minute playtime) followed by "music3.wav" (3-minute playtime). A second option is to play "music1.wav" (5-minute playtime) followed by "music6.wav" (2-minute playtime) followed by "music2.wav" (1-minute playtime). A third option is to play "music4.wav" (3.5-minute playtime) followed by "music5.wav" (1.5-minute playtime) followed by "music3.wav" (3-minute playtime). A fourth option is to play "music4.wav" (3.5-minute playtime) followed by "music5.wav" (1.5-minute playtime) followed by "music6.wav" (2-minute playtime) followed by "music2.wav" (1-minute playtime). If the preference is for the caller to hear the least number of selections, then the first option is selected and "music1.wav" is played to its conclusion. If, while "music1.wav" is being played, it is determine that the expected wait length has not changed, at the conclusion of "music1.wav," "music3.wav" is played to its conclusion, immediately followed by another event, such as transfer to a customer support agent.

In a third example, an expected wait time of 7 minutes has been determined and the control application selects possible play options from the database. One option is to play "music1.wav" (5-minute playtime) followed by "music6.wav" (2-minute playtime). A second option is to play "music4.wav" (3.5-minute playtime) followed by "music5.wav" (1.5-minute playtime) followed by "music6.wav" (2-minute playtime). If the preference is for the caller to hear the least number of selections, then the first option is selected and "music1.wav" is played to its conclusion. If, while "music1.wav" is being played, it is determine that the expected wait length has not changed, at the conclusion of "music1.wav," "music6.wav" is played to its conclusion, immediately followed by another event, such as transfer to a customer support agent. However, if the expected wait length changes during play of "music1.wav" to 8 minutes instead of 7 minutes, then the control application substitutes "music3.wav" (3-minute playtime) for "music6.wav" (2-minute playtime), which is played to its conclusion.

In a fourth example, an expected wait time of 45 seconds has been determined and the control application selects possible play options from the database. Although all of the database media files are long enough to satisfy the wait time, the control application can be configured to select the media file that is closest in length to the expected wait time. In this example, "music2.wav" has a 1-minute playtime and is selected and played. If the expected wait time does not change during the play of "music2.wav," then the volume is faded at the end of the wait period, immediately followed by another event, such as transfer to a customer support agent.

Figure 3:
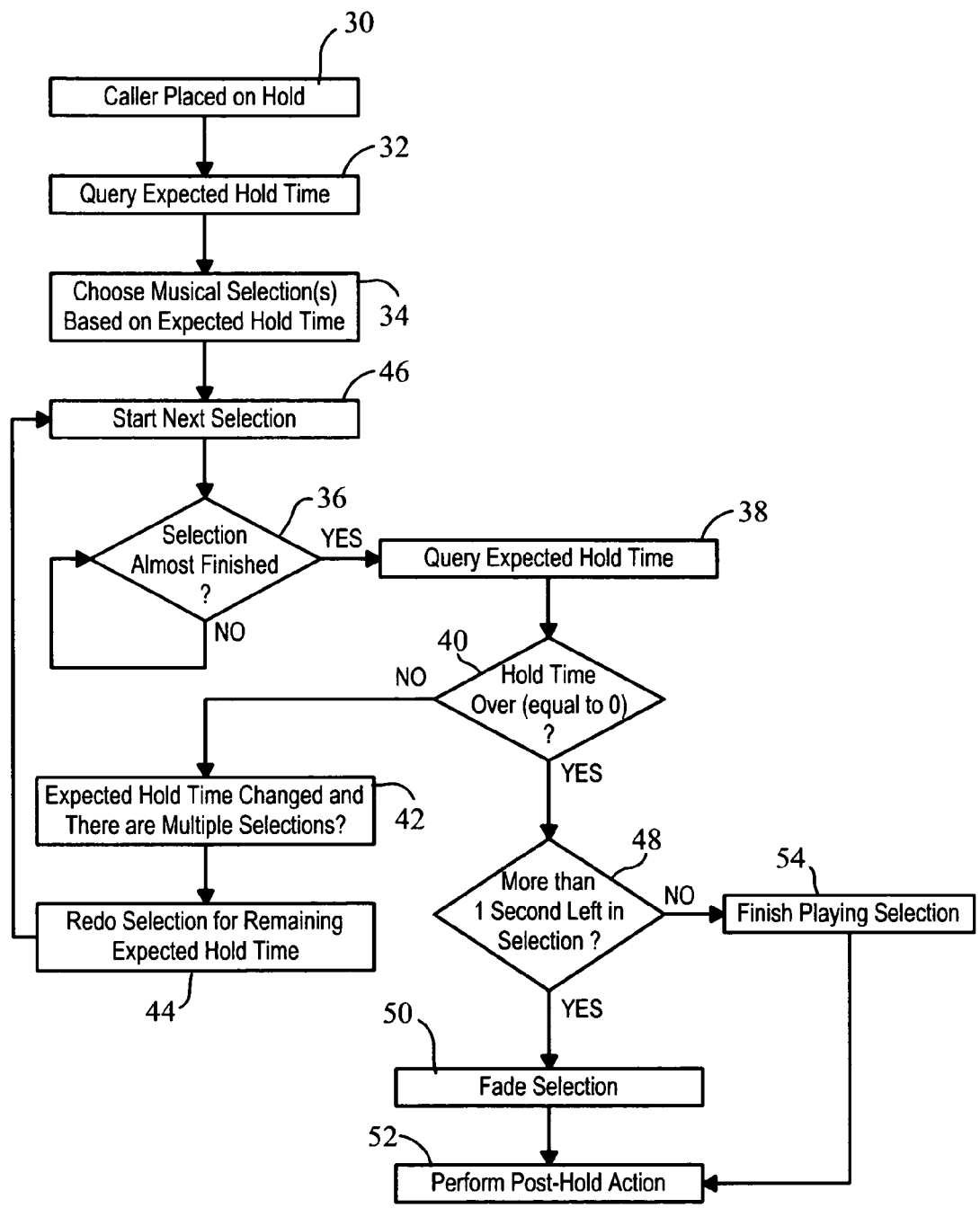
FIG. 3 is a flowchart for a control application of the system in accordance with the invention.

FIG. 3 is a flowchart of a sequence of events when a caller communicates directly or indirectly with the control system and the logical choices made by the control application. In a first step 30, a caller is placed on hold. In a step 32 the control application queries the expected hold time. Media files are selected as described above in the examples based on the expected hold time in step 34 and play of the first file begins. At a predetermined time (based upon system speed) identified by step 36, the media file is deemed to be "almost finished" and, in a step 38, the control application queries the expected hold time. As shown in step 40, if the hold time is not over, it is evaluated for changes in a step 42. If the hold time is not over, but the length of the hold has changed, the selection of media files to play is reselected in a step 44. Once the first media file is completed, the next selection is started at step 46. This process continues until the hold time is over as determined at step 40.

If more than one second remains in the selection, as determined in step 48, the audio volume of the selection is faded in step 50. At the end of the fade, the control application performs a post-hold action in step 52. However, if at step 48, less than one second of playtime remains, the media selection is permitted to play to completion in step 54 before performing a post-hold action at step 52. If the database includes tags for music genre, an additional step can be provided wherein a caller selects a genre prior to selection of music files by the control application.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method of adjusting media playtime to an expected waiting time between a first event and a second event, comprising the steps of:
    establishing a communications link with a caller;
    marking a first event by placing the caller on hold;
    estimating a waiting time between the first event and a second event;
    selecting a media file from fixed storage having a playback length computed to be substantially equivalent to the waiting time; and
    playing the media file over the established communications link to the caller.

2. The method of claim 1, further comprising the step of providing a plurality of media files of different durations.

3. The method of claim 2, further comprising the step of creating a playlist of more than one media file, wherein the runtime of the playlist is substantially equivalent to the waiting time.

4. The method of claim 3, further comprising the step of re-evaluating the waiting time while a media file from the playlist is playing and creating a different playlist if the waiting time has changed.

5. The method of claim 1, wherein the media file includes an audio component that is played at a selected volume, and further comprising the step of decreasing the volume from the selected volume within one second if the media file has a duration greater than the waiting time.

6. The method of claim 2, further comprising the step of associating media characteristics with each of the media files.

7. The method of claim 6, wherein the media characteristics include musical genre.

8. The method of claim 6, further comprising the step of creating a play list based upon a selected genre.

9. The method of claim 2, further comprising the step of creating a plurality of playlists with the plurality of media files, wherein the runtime of each play list is substantially equivalent to the waiting time.

10. The method of claim 9, further comprising the step of selecting a play list in accordance with a predetermined play list selection criteria.

* * * * *